(12) United States Patent
Neubecker et al.

(10) Patent No.: US 11,235,876 B2
(45) Date of Patent: Feb. 1, 2022

(54) DRONE-BASED VEHICLE ILLUMINATION

(71) Applicant: Ford Motor Company, Dearborn, MI (US)

(72) Inventors: Cynthia M. Neubecker, Westland, MI (US); Brad Alan Ignaczak, Canton, MI (US); Somak Datta Gupta, Canton, MI (US); Brian Bennie, Sterling Heights, MI (US)

(73) Assignee: Ford Motor Company, Dearborn, MI (US)

( * ) Notice: Subject to any disclaimer, the term of this patent is extended or adjusted under 35 U.S.C. 154(b) by 294 days.

(21) Appl. No.: 16/469,218

(22) PCT Filed: Dec. 14, 2016

(86) PCT No.: PCT/US2016/066597
§ 371 (c)(1),
(2) Date: Jun. 13, 2019

(87) PCT Pub. No.: WO2018/111258
PCT Pub. Date: Jun. 21, 2018

(65) Prior Publication Data
US 2020/0031468 A1 Jan. 30, 2020

(51) Int. Cl.
*B64C 39/00* (2006.01)
*B64C 39/02* (2006.01)
*B64D 47/04* (2006.01)

(52) U.S. Cl.
CPC ............ *B64C 39/024* (2013.01); *B64D 47/04* (2013.01); *B64C 2201/108* (2013.01); *B64C 2201/126* (2013.01); *B64C 2201/145* (2013.01)

(58) Field of Classification Search
CPC ............ B64C 39/024; B64C 2201/108; B64C 2201/126; B64C 2201/145; B64D 47/04; B64D 47/02; B60Q 1/50; B60Q 1/0035; B60Q 1/18
See application file for complete search history.

(56) References Cited

U.S. PATENT DOCUMENTS

| | | | | |
|---|---|---|---|---|
| 9,409,644 | B2 * | 8/2016 | Stanek | G05D 1/0094 |
| 9,471,059 | B1 * | 10/2016 | Wilkins | G05D 1/0094 |
| 10,977,734 | B1 * | 4/2021 | Kenney | G06Q 40/08 |
| 2012/0044710 | A1 * | 2/2012 | Jones | B64C 39/024 |
| | | | | 362/470 |
| 2016/0078759 | A1 * | 3/2016 | Nerayoff | G06T 7/248 |
| | | | | 701/3 |
| 2017/0305537 | A1 * | 10/2017 | Smith | B64C 39/024 |
| 2017/0320569 | A1 * | 11/2017 | Gordon | B64C 39/024 |
| 2018/0029522 | A1 * | 2/2018 | Gordon | B60Q 5/00 |
| 2018/0088595 | A1 * | 3/2018 | Bostick | G06F 16/29 |
| 2018/0233038 | A1 * | 8/2018 | Kozloski | G06F 16/29 |
| 2018/0354417 | A1 * | 12/2018 | Parissi | B64C 39/024 |

FOREIGN PATENT DOCUMENTS

| | | | | |
|---|---|---|---|---|
| CN | 104477399 | A * | 4/2015 | |
| CN | 106937456 | A * | 7/2017 | |
| EP | 2151661 | A1 * | 2/2010 | ............... F41G 3/02 |

* cited by examiner

*Primary Examiner* — Peter D Nolan
*Assistant Examiner* — Peter Y Ning
(74) *Attorney, Agent, or Firm* — Brandon Hicks; Eversheds Sutherland (US) LLP

(57) ABSTRACT

A computer is programmed to deploy an aerial drone to fly within a specified distance of a first vehicle. The computer is programmed to detect a second vehicle and then activate an aerial drone light.

18 Claims, 3 Drawing Sheets

DRONE-BASED VEHICLE ILLUMINATION

BACKGROUND

Vehicle lights provide visibility at night and under adverse environmental conditions, e.g., rain, fog, dust, etc. A vehicle light can help people and/or machines to recognize and locate the vehicle. Additionally, a vehicle light can help a vehicle occupant to recognize another vehicle proximate to the vehicle, e.g., another vehicle approaching the vehicle can be recognized.

DETAILED DESCRIPTION

Introduction

Figure 1:
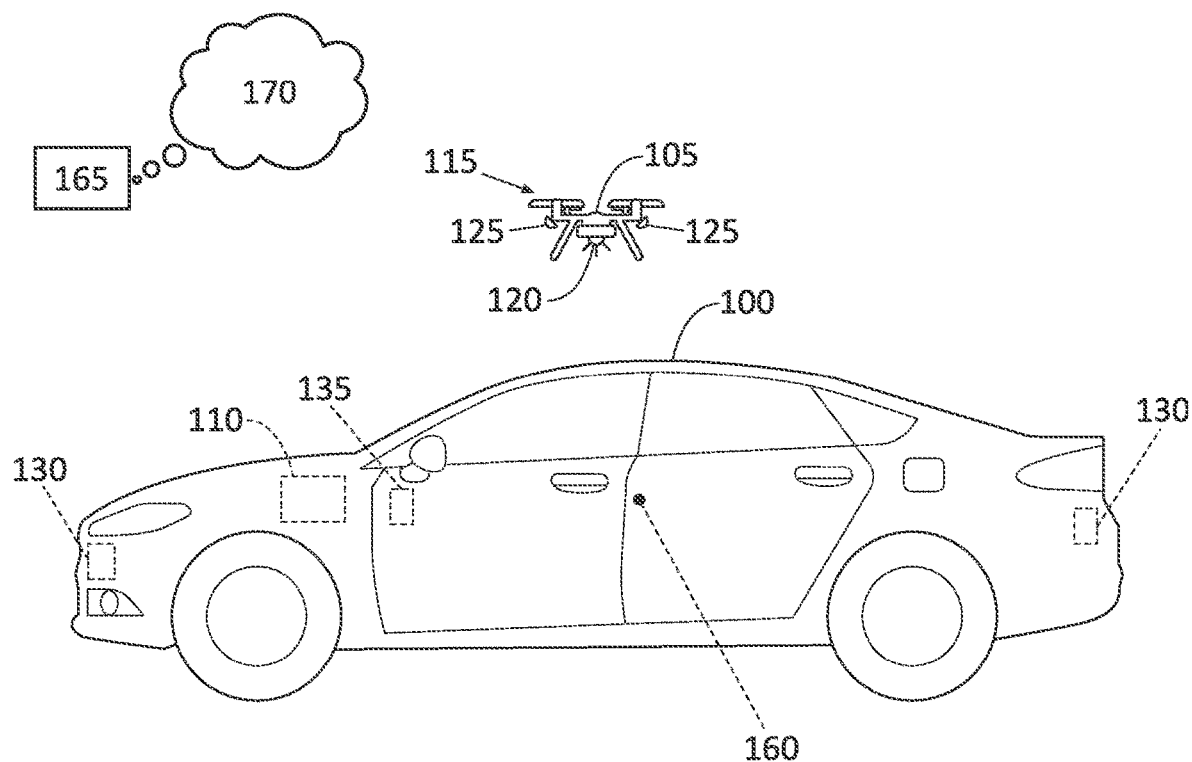
FIG. 1 is a block diagram of an exemplary vehicle and an aerial drone.
Figure 2:
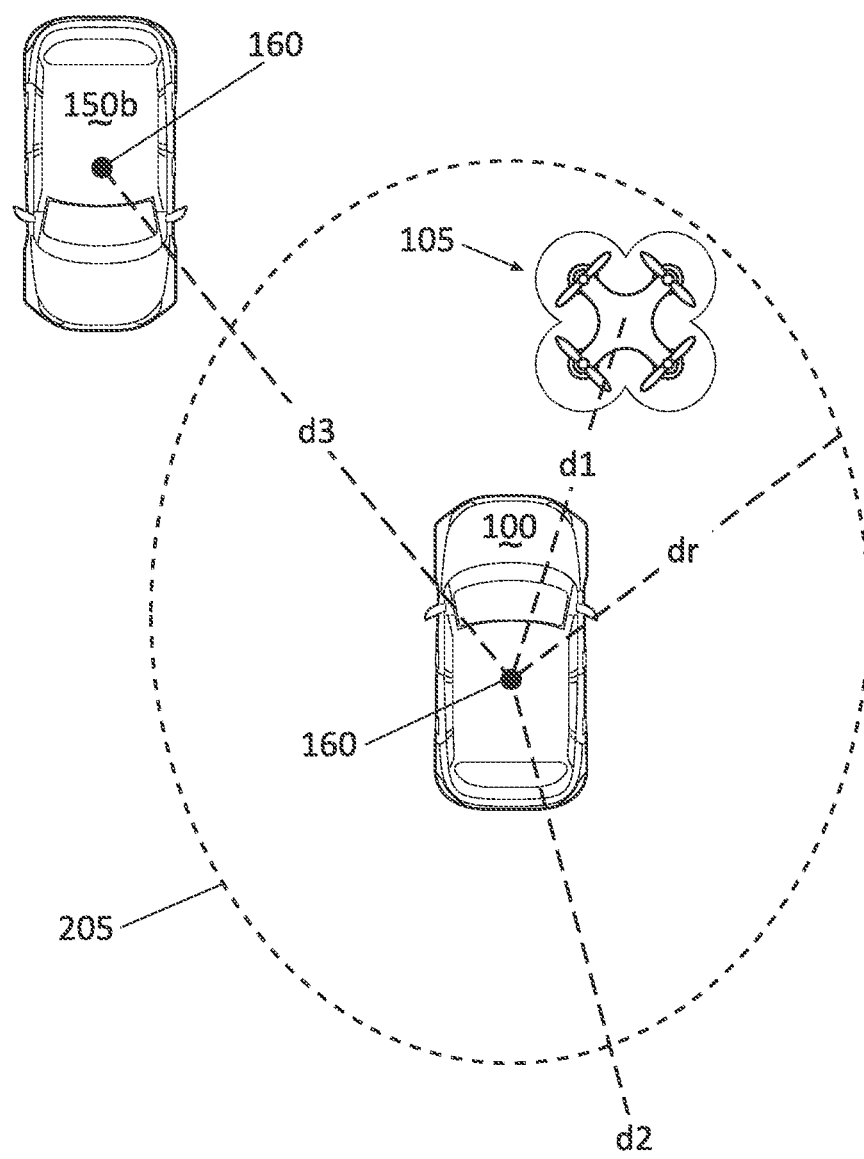
FIG. 2 is a diagram showing multiple vehicles and an aerial drone flying within a specified range of one of the vehicles.

Referring to FIGS. 1-2, an aerial drone 105 is deployed to fly within a specified distance $d_r$ of a first vehicle 100. A computer 110 in the first vehicle 100 detects one or more second vehicles 150a, 150b (see FIG. 2) and activates an aerial drone 105 light 120. The vehicle 100 may be referred to as a first or host vehicle 100 and a vehicle 150 other than the host vehicle 100 may be referred to as a second vehicle 150a, 150b.

Exemplary System Elements

FIG. 1 illustrates a host vehicle 100 and a drone 105. Although illustrated as a sedan, vehicle 100 may include any passenger or commercial vehicle with two or more wheels such as a motorcycle, car, a truck, a bus, etc.

The vehicle 100 may be powered in variety of known ways, e.g., with an electric motor and/or internal combustion engine. Each vehicle 100 includes the computer 110, sensors 130, a user interface 135, actuators, wireless communication interface, and other components discussed herein below. Further, a vehicle 100 includes a body having a geometrical center point 160. Note that components of a vehicle 150 are not separately illustrated because the vehicle 150 typically includes some or all of the elements described herein with respect to a vehicle 100, e.g., a computer 110, sensors 130, a center point 160, etc., and to the extent that components of the vehicle 150 are discussed herein, these are substantially the same as the discussed elements of the vehicle 100.

The computer 110 includes a processor and a memory such as are known. The memory includes one or more forms of computer-readable media, and stores instructions executable by the computer 110 for performing various operations, including as disclosed herein.

The computer 110 may operate the vehicle 100 in an autonomous or semi-autonomous mode. For purposes of this disclosure, an autonomous mode is defined as one in which each of vehicle 100 propulsion (e.g., via a powertrain including an electric motor and/or an internal combustion engine), braking, and steering are controlled by the computer 110; in a semi-autonomous mode the computer 110 controls one or two of vehicle 100 propulsion, braking, and steering.

The computer 110 may include programming to operate one or more of vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations.

The computer 110 is generally arranged for communications on a vehicle communication network which may include wireless and/or wired communications such as are known, e.g., including a communication bus such as a controller area network (CAN) or the like. The computer 110 may include or be communicatively coupled to, e.g., via a vehicle communications bus as described further below, more than one processor, e.g., controllers or the like included in the vehicle for monitoring and/or controlling various subsystems such as a powertrain, brake, steering, etc.

Via the vehicle network, the computer 110 may transmit messages to various devices in the vehicle 100, 150 and/or receive messages from the various devices, e.g., controllers, actuators, sensors, etc., including sensors 130. Alternatively or additionally, in cases where the computer 110 actually comprises multiple devices, the vehicle communication network may be used for communications between devices represented as the computer 110 in this disclosure. Further, as mentioned below, various controllers and/or sensors 130 may provide data to the computer 110 via the vehicle communication network.

In addition, the computer 110 may be configured for communicating via wireless communication interface with other vehicles 150 and/or drones 105, e.g., via a vehicle-to-vehicle (V-to-V) communication network. The V-to-V communication network represents one or more mechanisms by which the computers 110 of a vehicle 100 may communicate with other vehicles 150 and/or with a drone 105, and may be one or more of wireless communication mechanisms, including any desired combination of wireless (e.g., cellular, wireless, satellite, microwave and radio frequency) communication mechanisms and any desired network topology (or topologies when multiple communication mechanisms are utilized). Exemplary V-to-V communication networks include cellular, Bluetooth, IEEE 802.11, dedicated short range communications (DSRC), and/or wide area networks (WAN), including the Internet, providing data communication services.

Vehicle 100 sensors 130 may include a variety of devices known to provide data via the vehicle communications bus. For example, the sensors 130 may include one or more cameras, radars, and/or Light Detection and Ranging (LIDAR) sensors disposed in the vehicle 100, 150 providing data encompassing at least some of the vehicle exterior. The data may be received by the computer 110 through a suitable interface such as is known.

The sensors 130 may also include a GPS (global positioning system) sensor, i.e., a transceiver in communication with GPS satellites and with a vehicle navigation system to identify vehicle 100 location. A GPS sensor 130 may transmit, e.g., via the computer 110, current geographical coordinates, e.g., latitude and longitude as are known, of the vehicle 100, 150.

The user interface 135 is implemented via circuits, chips, or other electronic components that can receive user inputs provided by an occupant of a vehicle 100, 150. The user interface 135 may include a display screen for presenting information to the user and for prompting the user to provide various user inputs. The user interface 135 may further include buttons for receiving user inputs. In some possible approaches, the user interface 135 includes a touch-sensitive display screen that can present information to the occupant, prompt the occupant for information, and receive user inputs resulting from the occupant touching designated areas (virtual buttons or soft keys) of the touch-sensitive display screen. The user interface 135 may be programmed to output signals representing the user inputs received. The user interface 135 may be installed in a vehicle and or could be provided via a user device, e.g., a smartphone or the like, in wired or wireless communication with the computer 110.

The drone 105 is an unmanned aerial vehicle and includes a number of circuits, chips, or other electronic and/or electromechanical components that can control various operations of the drone 105. For instance, the drone 105 may fly in accordance with control signals output to its propeller actuators 115. The drone 105 may be outfitted with a navigation system so that it can fly to, and hover at, a particular location. The drone 105 may be deployed to, e.g., hover over a host vehicle 100, based on a deployment request received, e.g., from the host vehicle 100 user interface 135. Additionally, the drone 105 may land based on a received landing request. For example, the vehicle 100 computer 110 may actuate the drone 105 propeller actuators 115 to land in a designated area, e.g., on a vehicle 100 hood.

The drone 105 may include one or more camera sensors 125 that can capture images of an area near the drone 105. The camera sensors 125 may be mounted to a same housing as the lights 120, and the drone 105 may be programmed to turn on the camera sensors 125 to capture images of an area below the drone 105. Thus, when hovering over the host vehicle 100, the camera sensor 125 may capture images of the host vehicle 100 and possibly the area around the host vehicle 100. For example, a vehicle 100 computer 110, a drone 105 computer, etc. can be programmed to detect vehicles 150 based on images received from the drone 105 camera sensor(s) 125. Additionally or alternatively, a drone 105 may include other types of object detecting sensors 125 such as radar, LIDAR, etc.

The drone 105 may include a GPS sensor that provides GPS location coordinates of the drone 105, e.g., to a vehicle 100 computer 110, a drone 105 computer, etc. For example, the computer 110 may navigate the drone 105 based on the received GPS location coordinates.

The drone 105 may include one or more lights 120. For example, a computer 110 may be programmed to activate the drone 105 light 120 to illuminate, e.g., an area surrounding the drone 105.

The computer 110 and computers in vehicles 150 and the drone 105 may communicate with one another and with a remote computer 165 via a network 170 that includes one or more telecommunication protocols, e.g., cellular technologies such as 3G, 4G, LTE, etc., Bluetooth®, Bluetooth Low Energy®, WiFi, etc. In another example, the vehicle 100 computer 110 may actuate the drone 105 based on a deployment request received via the vehicle 100 user interface 135 and/or information, e.g., weather data, received from the remote computer 165.

Referring now to FIG. 2, a vehicle 100 computer 110 can be programmed to deploy a drone 105 to fly within a specified area 205 with respect to, e.g., a circle with a radius that is a specified distance $d_r$ of, a first vehicle 100 center point 160. For example, the computer 110 can be programmed to deploy the drone 105 within a specified distance $d_r$ such that a distance $d_1$ between the drone 105 and the first vehicle 100 center point 160 is less than the specified distance $d_r$ from a first vehicle 100 center point 160. The computer 110 can be programmed to detect one or more second vehicles 150a, 150b and then activate a drone 105 light 120, e.g., based on the detection of the second vehicles 150a, 150b.

In one example, the drone 105 may hover above a non-moving vehicle 100 within the specified area 205. In another example, when the host vehicle 100 is moving, the specified area 205 may change based on a vehicle 100 movement. For example, the computer 110 may be programmed to periodically, e.g., once per second, determine a current location of the first vehicle 100 and modify a specified area 205 based on a current location of the first vehicle 100, e.g., an area within a distance threshold $d_r$ from the current location of the first vehicle 100. In one example, a distance $d_r$ may refer to a horizontal distance of the drone 105 to the host vehicle 100, i.e., independent from the drone 105 height. Additionally or alternatively, a specified distance $d_r$ may be accompanied by a height specification for the drone 105, e.g., an area above a predetermined height from the ground surface such as 10 meters and/or below a second predetermined height from the ground surface such as 20 meters. Alternatively, a specified area 205 may include an area that is not symmetric relative to the host vehicle 100 center 160, e.g., an area such as a semi-circle with a radius $d_r$ in front of the host vehicle 100.

In one example, the computer 110 can be programmed to receive a deployment request, e.g., from the vehicle 100 computer 110, e.g., according to user input to a user interface 135, and deploy the drone 105 based on the received deployment request by actuating the drone 105 actuators 115. In another example, the remote computer 165 may receive a deployment request from a user device such as a mobile device and actuate the drone 105 based on the received deployment request. Additionally or alternatively, rather than a user input, a deployment request may be transmitted by a police station, fire station, hospital, ambulance service, vehicle service center, etc. Thus, if a user of the host vehicle 100 were to call the emergency service provider to report an emergency or otherwise request assistance, the emergency service provider may communicate with the remote computer 165 to instruct the remote computer 165 to transmit the deployment request to the host vehicle 100 computer 110.

In one example, the deployment request may include commands for the drone 105 to follow the host vehicle 100. The computer 110 can be programmed to deploy the drone 105 by periodically determining a location of the first vehicle 100 and modifying a specified deployment area based on a current determined location of the first vehicle 100. For example, the computer 110 may periodically determine the location of the host vehicle 100 and modify the specified area to be an area within a distance $d_r$ from the current location of the host vehicle 100 center point 160.

In another example, the deployment request may include various modes of operation, e.g., a headlight extension mode. In the headlight extension mode, the computer 110 may be programmed to activate the light 120 to illuminate an area in front of the first vehicle 100, e.g., to expand a visibility of road ahead of the vehicle 100 for a vehicle 100 driver and/or vehicle 100 sensors such as a camera sensor 130. For example, in the headlight extension mode, the drone 105 light 120 may illuminate an area in front of the vehicle 100 beyond a reach of vehicle 100 headlights. In another example, in the headlight extension mode, the drone 105 light 120 may illuminate objects such as a second vehicle 150a to improve a detection of the second vehicle 150a by a vehicle 100 driver and/or the vehicle 100 camera sensor 130. As another example, the modes of operation may include an indicator light mode. In the indicator light mode, the drone 105 may activate the light 120 to illuminate the host vehicle 100 and/or its surrounding area.

In one example, the computer 110 may be programmed to activate the drone 105 light 120 only if a distance between the first vehicle 100 and a second vehicle 150 is less than a predetermined threshold, e.g., 250 meters. For example, the computer 110 may detect the second vehicles 150a, 150b that are in distances $d_2$, $d_3$ from the first vehicle 100 center point 160. The computer 110 then activates the light 120 upon determining that at least one of the distances, e.g., $d_3$, is less than the predetermined threshold. Additionally or alternatively, the computer 110 may receive location of a mobile device, e.g., GPS location coordinates, and activate the light 120 when a distance between the mobile device and the vehicle 100 center point 160 is less than a predetermined threshold. Thus, advantageously a consumption of electrical energy by the drone 105 light(s) 120 may be reduced compared to permanent activation of the light 120.

Additionally or alternatively, the computer 110 can be programmed to activate the light 120 if the second vehicle 150b approaches the first vehicle 100. For example, the computer 110 can be programmed to activate the light 120 if the distance $d_3$ between the vehicles 100, 150b is decreasing. For example, when a distance $d_3$ is determined periodically, "decreasing" in this context means a current distance $d_3$ is less than a last determined distance $d_3$. In another example, the computer 110 may be programmed to activate the light 120 when a distance between the first vehicle 100 and a second vehicle 150 is less than a predetermined threshold and/or is decreasing.

Referring to a mode of operation as discussed above, e.g., when the deployment request includes the indicator light mode, the computer 110 may be programmed to activate the light 120 to illuminate an area within a specified area proximate to the first vehicle 100. For example, the computer 110 may activate the light 120 to illuminate an area within a radius of 10 meters around the first vehicle 100. Thus, advantageously, a driver and/or a camera sensor 130 of the second vehicle 150b and/or a pedestrian may be more likely to detect the first vehicle 100 compared to a first vehicle 100 that is not illuminated by a drone 105 proximate the vehicle 100.

In the headlight extension mode, the computer 110 may be programmed to activate the light 120 to illuminate the detected second vehicle 150b. For example, in the headlight extension mode, the computer 110 may be programmed to illuminate the second vehicle 150b by adjusting at least one of a pitch, a roll, and a yaw of the drone 105, e.g., by actuating the drone 105 actuators 115 to change the pitch, the roll, and/or the yaw. Thus, the computer 110 may change an area illuminated by the drone 105 light 120 to illuminate the second vehicle 150b. Additionally or alternatively, the computer 110 may change a location of the drone 105 to illuminate the second vehicle 150b. For example, the computer 110 may move the drone 105 to another location within the specified distance $d_r$ to illuminate the second vehicle 150b.

In one example, the computer 110 may be programmed to position the drone 105 light 120 to illuminate the second vehicle 150b based on data indicating the second vehicle 150b location. For example, the computer 110 may receive second vehicle 150b location coordinates from a drone 105 sensor 125, a first vehicle 100 sensor 130, a second vehicle 150b GPS sensor 130, and/or the remote computer 165.

Processing

Figure 3:
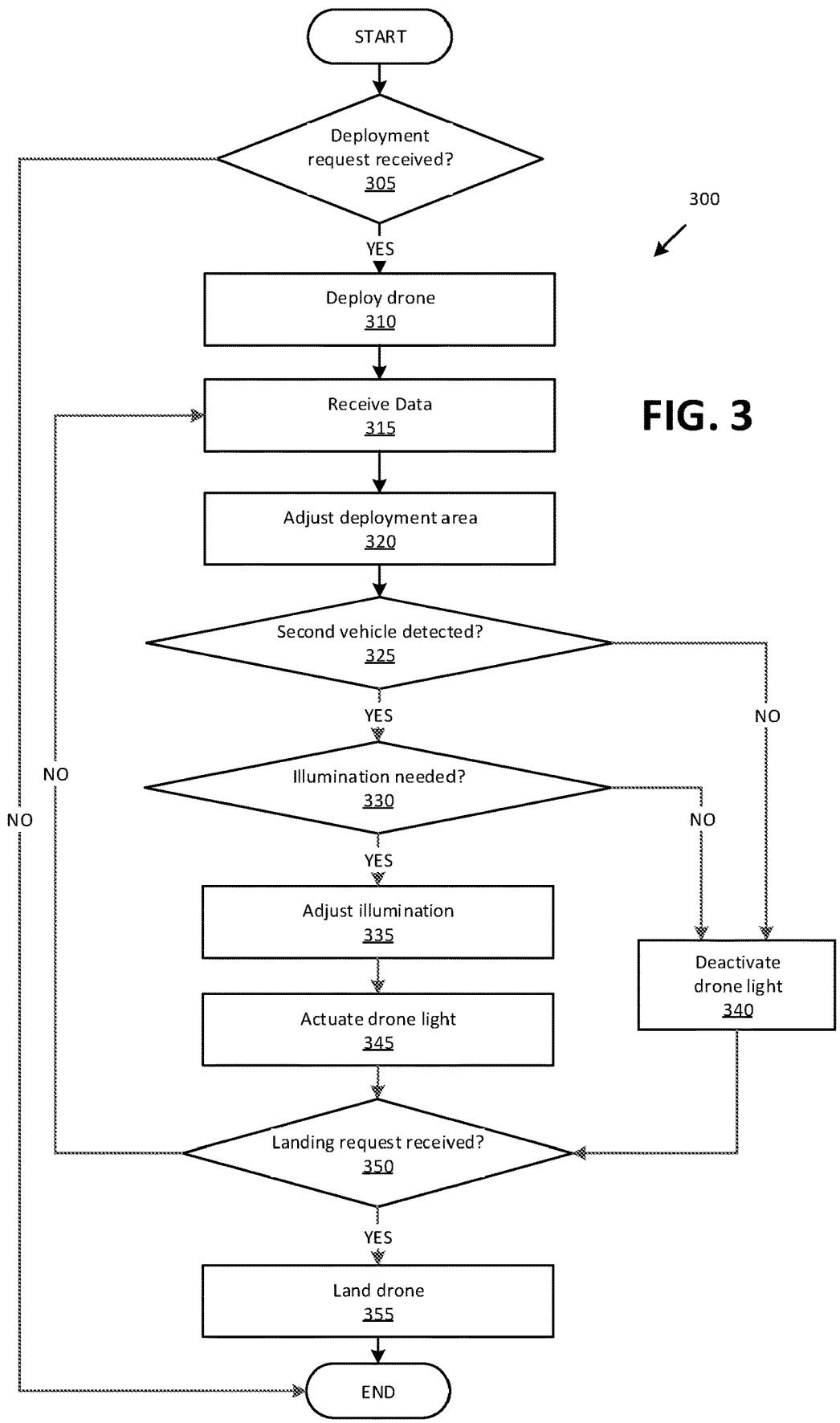
FIG. 3 is a flowchart of an exemplary process for deploying a drone.

FIG. 3 is a flowchart of an example process 300 for deploying a drone 105. Steps of the process 300 described below as executed in a first vehicle 100 computer 110, could alternatively or additionally be executed in one or more other computing devices, e.g., a drone 105 computer, a remote computer 165, or a combination thereof.

The process 330 begins in a decision block 305, in which the computer 110 determines whether a deployment request is received. For example, the computer 110 may receive the deployment request from the remote computer 165, a vehicle 100 user interface 135, a mobile device, etc. The deployment request may include a specified area 205 of deployment, e.g., a distance threshold $d_r$ relative to the first vehicle 100 center point 160, a mode of operation, e.g., the headlight extension mode, and a current location of the first vehicle 100, e.g., GPS location coordinates. If the computer 110 determines that the deployment request is received, then the process 300 proceeds to a block 310; otherwise the process 300 ends, or, alternatively, returns to the decision block 305.

In the block 310, the computer 110 deploys a drone 105. In one example, the deployed drone 105 is associated with the first vehicle 100, e.g., via a drone 105 identifier associated with the first vehicle 100 identifier, e.g., a Vehicle Identification Number (VIN) or the like. Additionally or alternatively, the computer 110 may select a drone 105 for deployment, e.g., based on the deployment request. For example, the deployment request may include the drone 105 identifier. To deploy the drone 105, the computer 110 may actuate the drone 105 actuators 115 to fly. The computer 110 may deploy the drone 105 within a specified area 205 included in the deployment request.

Next, in a block 315, the computer 110 receives data from, e.g., vehicle 100 sensors 130, drone 105 sensors 125, remote computer 165, second vehicle 150 sensors 130, etc. In one example, the received data may include location of the vehicles 100, 150, and the drone 105. As another example, the received data may include a speed and/or direction of movement of the vehicles 100, 150. In another example, the received data may include a height, a roll, a pitch, a horizon, and/or a speed of the drone 105.

Next, in a block 320, the computer 110 adjusts a deployment area of the drone 105. For example, when the first vehicle 100 moves, the computer 110 may adjust the deployment area to be within a distance $d_r$ relative to a current location of the first vehicle 100. In another example, the computer 110 may adjust the deployment area based on received data from the vehicle 100 user interface 135. For example, the computer 110 may receive data, e.g., from the vehicle 100 user interface 135, including an updated specified distance $d_r$ threshold, e.g., 5 meters, from the first vehicle 100.

Next, in a decision block 325, the computer 110 determines whether a second vehicle 150 is detected. For example, the computer 110 may detect one or more second vehicles 150a, 150b based on data received from the drone 105 camera sensors 125 and/or received from the vehicle 100 sensors 130. Additionally, the computer 110 may determine a location of a detected second vehicle 150 based on the received data, e.g., using image processing techniques as are known. Additionally or alternatively, the computer 110 may detect a second vehicle 150 based on the second vehicles 150 location coordinates received from the remote computer 165 and/or a second vehicle 150 computers. If the computer 110 detects a second vehicle 150, then the process 300 proceeds to a decision block 330; otherwise the process 300 proceeds to a block 340.

In the decision block 330, the computer 110 determines whether illumination is needed, i.e. whether to activate the drone 105 light 120. In one example, the computer 110 determines that the illumination is needed when a distance $d_2$, $d_3$ between the first vehicle 100 and at least one of the detected second vehicles 150a, 150b is less than a predetermined threshold. In another example, the computer 110 may determine that the drone 105 light 120 has to be activated when a detected second vehicle 150b approaches the first vehicle 100. If the computer 110 determines that the illumination is needed, then the process 300 proceeds to a block 335; otherwise the process 300 proceeds to the block 340.

In the block 335, the computer 110 adjusts the drone 105 illumination based at least in part on the deployment request. For example, in the headlight extension mode, the computer 110 may instruct actuation of the drone 105 actuators 115 (e.g., send a wireless message to a drone 105 computer) to adjust parameters such as a pitch, a roll, a yaw, and/or a height of the drone 105 to focus the light 120 on a detected vehicle 150b. In one example, the computer 110 may periodically adjust the drone 105 parameters based on a speed and direction of movement of the vehicle 150b. In another example, in the indicator light mode, the computer 110 may actuate the drone 105 actuators to focus the drone 105 light 120 on the first vehicle 100 and/or an area surrounding the first vehicle 100.

Next, in a block 345, the computer 110 actuate the drone 105 light 120 to shine light. In one example, the drone 105 may include multiple lights 120. For example, the computer 110 may actuate one or more of the drone 105 lights 120 based at least in part on the mode of operation, e.g., an indication light 120 and a headlight extension light 120. In another example, the computer 110 may actuate a drone 105 front light 120 to shine light on the second vehicles 150a, 150b respectively.

Next, in a decision block 350, the computer 110 determines whether a landing request is received from, e.g., the vehicle 100 user interface 135, the remote computer 165, etc. A received landing request may include a landing location, e.g., GPS location coordinates of a first vehicle 100 hood. If the computer 110 determines that a landing request is received, then the process 300 proceeds to a block 355; otherwise the process 300 returns to the block 315.

In the block 340, the computer 110 deactivates the drone 105 light 120. For example, if no second vehicle 150 is detected and/or no illumination is needed, the computer 110 actuates the light 120 to turn off. Typically, the computer 110 will actuate the light 120 to turn OFF only if determined that the light 120 is ON.

In the block 355, the computer 110 navigates the drone 105 actuators 115 to land, e.g., in a designated area indicated in the landing request.

Following the block 355, the process 300 ends, or alternatively returns to the decision block 305, although not shown in FIG. 3.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The invention claimed is:

1. A computer, comprising a processor and a memory, the memory storing instructions executable by the processor such that the computer is programmed to:
   deploy an aerial drone to fly within a specified distance of a first vehicle;
   detect a second vehicle;
   receive data from one or more drone sensors indicating a location of the second vehicle;
   then activate an aerial drone light; and position, based on the data, the aerial drone light to illuminate the second vehicle.

2. The computer of claim 1, further programmed to activate the drone light only if a distance between the first vehicle and the second vehicle is less than a predetermined threshold.

3. The computer of claim 1, further programmed to activate the drone light to illuminate an area within a specified area proximate to the first vehicle, wherein the specified area is determined based on a radius $d_r$.

4. The computer of claim 1, further programmed to activate the drone light to illuminate the second vehicle.

5. The computer of claim 4, further programmed to illuminate the second vehicle based on a second vehicle location by adjusting at least one of a drone pitch, a drone roll, and a drone yaw.

6. The computer of claim 1, further programmed to:
receive a deployment request including a mode of operation and a specified deployment area, wherein the mode of operation is one of a headlight extension mode and an indicator light mode; and
deploy the drone according to the mode of operation.

7. The computer of claim 6, further programmed to receive the deployment request from the first vehicle.

8. The computer of claim 1, further programmed to deploy the drone by:
periodically determining a location of the first vehicle; and
modifying a specified deployment area based on a determined current location of the first vehicle.

9. The computer of claim 1, further programmed to receive, from a user's mobile device, data including a location of the user's mobile device, and the computer is further programmed to activate the drone light to illuminate when a distance between the first vehicle and the user's mobile device is less than a predetermined threshold.

10. A method, comprising:
deploying an aerial drone to fly in a specified range of a first vehicle;
detecting a second vehicle;
receiving data from one or more drone sensors indicating a location of the second vehicle;
actuating an aerial drone light to illuminate upon detection of the second vehicle; and
positioning, based on the data, the aerial drone light to illuminate the second vehicle.

11. The method of claim 10, wherein the aerial drone light is actuated only if a distance between the first vehicle and the second vehicle is less than a predetermined threshold.

12. The method of claim 10, wherein actuating the aerial drone light further includes activating the drone light to illuminate an area within a specified area proximate to the first vehicle, wherein the specified area is determined based on a radius $d_r$.

13. The method of claim 10, further comprising activating the drone light to illuminate the second vehicle based on a second vehicle location.

14. The method of claim 13, wherein activating the drone light to illuminate the second vehicle based on the second vehicle location further includes adjusting at least one of a drone pitch, a drone roll, and a drone yaw.

15. The method of claim 10, further comprising:
receiving a deployment request including a mode of operation and a specified deployment area, wherein the mode of operation is one of a headlight extension mode and an indicator light mode; and
deploying the drone according to the mode of operation.

16. The method of claim 15, wherein the deployment request is received from the first vehicle.

17. The method of claim 15, wherein deploying the drone further includes:
periodically determining a location of the first vehicle; and
modifying a specified deployment area based on a determined current location of the first vehicle.

18. The method of claim 10, further comprising:
receiving, from a user's mobile device, data including a location of the user's mobile device; and
activating the drone light to illuminate when a distance between the first vehicle and the user's mobile device is less than a predetermined threshold.

* * * * *